United States Patent [19]
Richter

[11] Patent Number: 5,896,298
[45] Date of Patent: Apr. 20, 1999

[54] SYSTEM AND METHOD FOR PROVIDING CENTRAL NOTIFICATION OF ISSUED ITEMS

[75] Inventor: Victoria H. Richter, Dallas, Tex.

[73] Assignee: Carreker-Antinori, Inc., Dallas, Tex.

[21] Appl. No.: 08/908,898

[22] Filed: Aug. 8, 1997

[51] Int. Cl.$^6$ .................................................. G06F 17/00
[52] U.S. Cl. ...................... 364/479.01; 235/380; 235/379
[58] Field of Search .................................. 235/379, 380; 364/479.01

[56] References Cited

U.S. PATENT DOCUMENTS 5,808,894  9/1998  Wiens et al. ..................... 364/479.01

Primary Examiner—Harold Pitts

[57] ABSTRACT

A system for, and method of, providing advance notification of issued items. In one embodiment, the system includes: (1) a data collection subsystem that gathers data regarding the issued items from an entity having issued items and transmits the data in a prescribed form and (2) a data storage and communication subsystem, including a central database, that receives the data from the data collection subsystem, combines the data with data gathered from other entities having issued items, stores the combined data in the central database and provides access of the central database to a potential item recipient thereby to allow the potential item recipient to receive advance notification as to whether an item to be received by the potential item recipient was properly issued.

20 Claims, 3 Drawing Sheets

SYSTEM AND METHOD FOR PROVIDING CENTRAL NOTIFICATION OF ISSUED ITEMS

TECHNICAL FIELD OF THE INVENTION

The present invention is directed, in general, to a computer system, and, more specifically, to a system and method for collecting, storing and disseminating information regarding items (such as checks) that have been issued and, accordingly, may be presented to corporations and/or financial institutions ("FIs") for processing or payment.

BACKGROUND OF THE INVENTION

Check fraud has been a problem for both financial institutions and retailers for decades, and the incidence involving check fraud has been on the increase for the last several years. Whenever a person forges a check on an account, one type of potential check fraud occurs. The person either makes the forged check payable to himself or a fictitious payee. The person then tenders the check to a retailer, perhaps in payment for goods or services received and perhaps with a request for cash. Alternatively, the person may tender the check directly to an FI (a "presenting FI") in the form of a deposit with a simultaneous request for cash (by means of the "less cash" field present on conventional deposit slips, such fraud being commonly called "less cash" fraud). Either way, the check ends up at a presenting FI, which, in the usual course of business, must determine (among other things) whether the check is genuine. Even with today's sophisticated presentment systems, this process can take precious days.

If the presenting FI finds the check to be a forgery, the retailer or the FI may take harsh measures against the person, if he can be found. The immediate victim in this scenario is, of course, the retailer or the presenting FI to which the check is originally tendered, and the cost to the retailer or presenting FI is the amount of the fraudulent check. The cost of such fraud is typically passed on in the form of increased prices to customers in general, who collectively then become the ultimate victims.

Both civil and criminal enforcement against fraudulent check writers are, unfortunately, difficult and most often will not lead to complete financial restoration. Habitual fraudulent check writers are difficult for the authorities to apprehend, because they can easily move from one geographical location to another and successfully evade the authorities while continuing to write fraudulent checks. Even when apprehended, however, they are usually financially incapable of making full financial restitution.

In an attempt to mitigate the problem of fraudulent check writers, retailers and FIs, in the past, have often relied on the "best judgment" of their cashiers or store managers, who examined photo ID cards, such as driver's licenses, and evaluated checks against an established local procedures. This process, however, has been only minimally effective and does not alert the retailers to the more sophisticated fraudulent check writers.

Additionally, retailers have turned to check-guarantee companies. Guarantee companies typically reimburse retailers if an approved check is returned for fraudulent reasons and also takes on the obligation of collecting the funds from the person who has forged the check. While these companies do protect the retailers from the financial risk, their services are costly, and again this cost is typically passed on to the consumers through increased prices for goods or services.

To overcome these deficiencies, check authorization networks ("CAN") have been formed in which retailers share information on returned checks and closed checking accounts. These systems may further incorporate information from a financial institution's database that is manually input into the CAN system. Typically, a retailer, who is a member of CAN is provided a host computer terminal for entry of returned check information or uses a host to host connection. A CAN master computer system retrieves that information from the retailer's computer terminal or host, adds or deletes checking account and driver's license numbers from the CAN master database and may redistribute the updated information to the retailer's computer systems for point-of-sale ("POS") access, retailers can select either national or regional database access.

The retailer's host computer is accessed through its POS terminals. Daily, the CAN master computer sends the retailer updates about fraudulent and returned check accounts that were received by other retailers. The retailer, in turn, uploads information concerning the returned checks it has received into the CAN master computer system, which, in turn, is distributed to or accessible by other retailers, who participate in the system. The type of information that is available with respect to the check may vary from one system to another. However, the more salient information typically includes the payor's name, address, driver's license number, social security number, and FI, account number and reason for inclusion on the file.

When a retailer or FI accepts a check from a person, the payor's checking account and/or driver's license number is provided to the POS terminal for verification purposes. If the person has an outstanding returned check, the retailer receives a decline code. It is then the person's obligation to contact someone within the check authorization network to remedy the problem. Once all outstanding returned checks have been paid by the person to the various payees, the CAN's master computer is updated with this information and downloaded to the retailer's host computer. After the updated information is downloaded and made accessible by the POS terminals, the payor's checks may then be accepted at various point-of-sale terminals.

The check authorizations networks, as just generally discussed, are very effective in deterring fraudulent check writing. However, there are certain areas in which it is desirable to make these systems even more efficient and effective.

SUMMARY OF THE INVENTION

To address the above-discussed deficiencies of the prior art, the present invention provides a way of notifying potential item recipients as to whether an item tendered to them has been properly issued or, perhaps, previously paid, to allow them to assess whether or not to accept the tendered item.

A system for, and method of, providing advance notification of issued items. In one embodiment, the system includes: (1) a data collection subsystem that gathers data regarding the issued items from an entity having issued items and transmits the data in a prescribed form and (2) a data storage and communication subsystem, including a central database, that receives the data from the data collection subsystem, combines the data with data gathered from other entities having issued items, stores the combined data in the central database and provides access of the central database to a potential item recipient thereby to allow the potential item recipient to receive advance notification as to whether an item to be received by the potential item recipient was properly issued. "Properly issued" means that the item actually issued from the entity from which the item purports (usually on its face) to have been issued. "Properly issued" does not necessarily mean that the item issued pursuant to the entity's internal policies. In fact, an accountant may defraud a company by fraudulently issuing a "properly issued" check.

The present invention therefore introduces the broad concept of providing a central network for collecting and disseminating information about items (such as checks) that have been properly issued. If a potential item recipient receives an item (such as a forged check) that does not appear on the list of issued items, the recipient is given a good indication that the item may not be genuine.

In one embodiment of the present invention, the data includes an indication that ones of the issued items have been previously paid. "Previously paid" means that the item has been paid or tendered for payment. Although the broad scope of the present invention does not require the data to include indications of previous payment, such indications are valuable in tracking items that may be tendered multiple times in an effort to commit fraud.

In one embodiment of the present invention, the system further comprises a dial-up link coupling a point-of-sale terminal associated with the potential item recipient with the central database. In this embodiment, each potential item recipient is granted access to the central database for the purpose of verifying items. The dial-up link allows the potential item recipient to contact and pass a standard query to the central database. The database replies with data concerning the item that has been tendered, if it contains such data.

In one embodiment of the present invention, the system further comprises a dial-up link coupling the data collection subsystem and the data storage and communication subsystem. This dial-up link, while not necessary to the present invention, allows the data collection subsystem to upload the data as a batch to the data storage and communication subsystem. Alternatively, the link may be a dedicated line coupling the two subsystems, allowing either batch or continuous uploading of data.

In one embodiment of the present invention, the data collection subsystem comprises a sequence of instructions executable in a general purpose computer system for performing a batch extract of the data. Of course, those of skill in the art understand that computer hardware or discrete electronic circuits may be configured to achieve the invention in its broadest form.

In one embodiment of the present invention, the potential item recipient is selected from the group consisting of: (1) a retailer and (2) a presenting FI.

In one embodiment of the present invention, the system further comprises a plurality of data collection subsystems corresponding to the other entities. Thus, the present invention is particularly suited for operation with a number of entities as an integrated, perhaps national, network.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
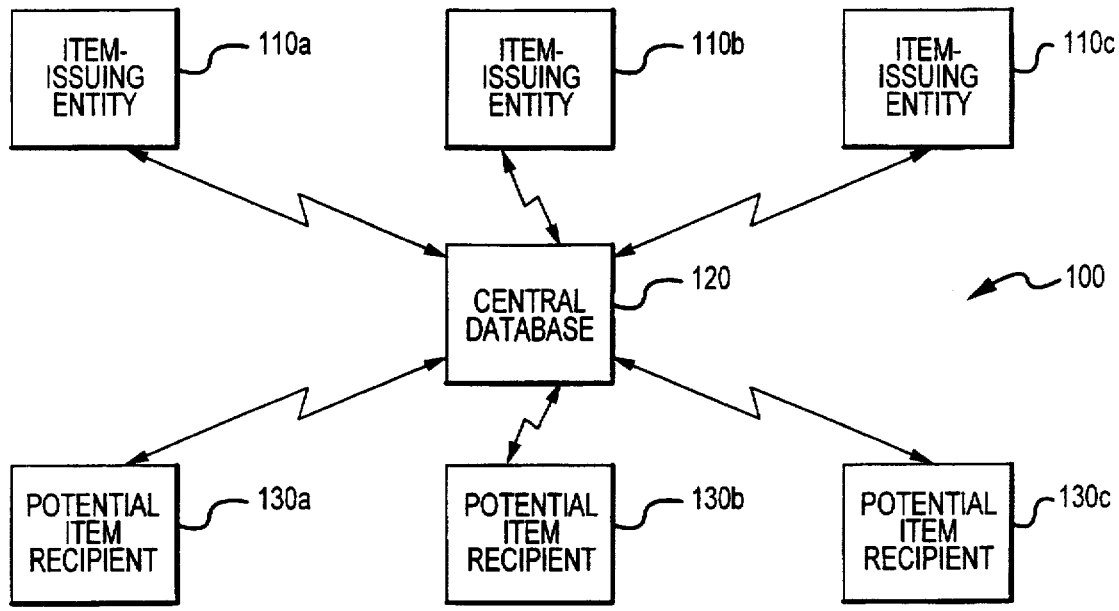
FIG. 1A illustrates a block diagram of one embodiment of a system for providing advance notification of issued items constructed according to the principles of the present invention.

Referring initially to FIG. 1A, illustrated is a block diagram of one embodiment of a system for providing advance notification of issued items constructed according to the principles of the present invention.

The system, generally designated 100, comprises a plurality of item-issuing entities 110a, 110b, 110c. The item-issuing entities may be persons, corporations, governments, or any other kind of entity that issues items. As set forth above, "item" is defined for purposes of the present invention as an instrument, such as a draft, check or note, that can enter and be processed through a presentment system.

The present invention is adapted for use with, for example, corporate payroll or non-payroll checks, money orders, cashier's checks or welfare checks and even other forms of payment, such as food stamps.

The item-issuing entities 110a, 110b, 110c are coupled to a central database 120 that is capable of storing data concerning items that the item-issuing entities 110a, 110b, 110c have issued. It should be understood that "central" is used in the architectural sense, and that the database may be distributed over multiple locations and certainly need not be geographically central.

FIG. 1A further shows a plurality of potential item recipients 130a, 130b, 130c. The potential item recipients 130a, 130b, 130c are presumably in possession of an item that a person has tendered to them as part of a financial transaction. The term "potential" is used because the potential item recipients 130a, 130b, 130c have not accepted the item in question and therefore have an opportunity to refuse it.

The item-issuing entities 110a, 110b, 110c and the potential item recipients 130a, 130b, 130c are capable of communicating, by some means (illustrated in FIG. 1A with unreferenced communication links), with the central database 120, allowing them to share valuable information regarding issued items, giving the potential item recipients 130a, 130b, 130c the opportunity to make an intelligent decision whether to accept items or not.

The present invention can operate with a conventional CAN system. Conventional CAN systems provide member retailers with up-to-date information regarding checking accounts that have been closed for cause by the various FIs that participate in the CAN system. This information is automatically retrieved from the FI's mainframe or PC computer and downloaded to the participating CAN system's mainframe computers and ultimately transmitted from there to the retailer's host computer for POS or similar-type terminal access. The end result is that the retailer does not receive a potentially fraudulent check for goods or services. The information regarding closed for cause accounts is also made available to FIs for use in the new account authorization process. For more information regarding notification of closed for cause accounts, see, U.S. Ser. No. 08/535,739, filed on Sep. 28, 1995, entitled *System and Method for Providing Electronic Advance Notification of Closed for Cause Financial Institution Accounts*, commonly assigned with the present invention and incorporated herein by reference.

Figure 1B:
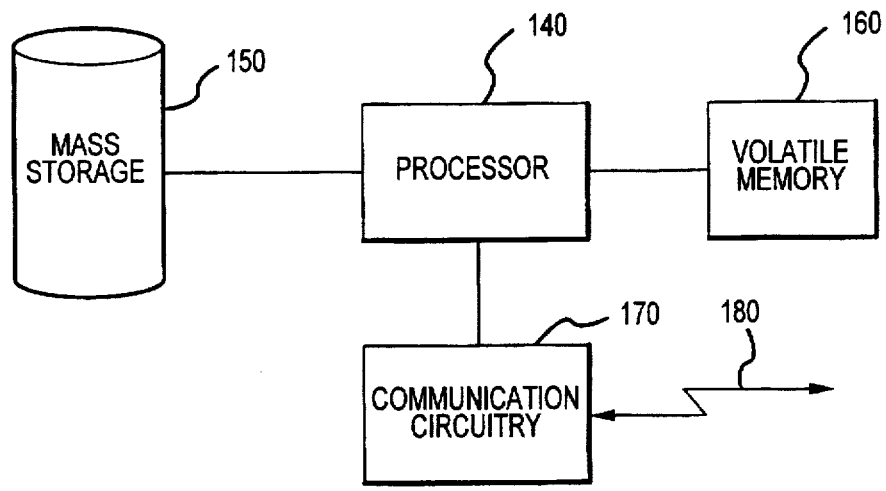
FIG. 1B illustrates a block diagram of exemplary general purpose data processing, storage and communication circuitry that can reside within the system of FIG. 1A to effect operation thereof.

Turning now to FIG. 1B, illustrated is a block diagram of exemplary general purpose data processing, storage and communication circuitry that can reside within the system of FIG. 1A to effect operation thereof. The circuitry comprises a processor 140, a mass storage unit 150, volatile memory 160 and communication circuitry 170.

The circuitry illustrated in FIG. 1B is intended to represent a wide array of computing platforms. Accordingly, the circuitry may be a mainframe, minicomputer or personal computer ("PC"). The present invention is not limited whatsoever to a particular class of computing platform. With reference back to FIG. 1A and continuing reference to FIG. 1B, each of the item-issuing entities 110a, 110b, 110c, the central database 120 and the potential item recipients 130a, 130b, 130 may have the circuitry illustrated in FIG. 1B associated therewith.

The communication links illustrated in FIG. 1A may be initiated by the communication circuitry 170 of FIG. 1B. Accordingly, the communication circuitry 170 is shown with an exemplary communication link 180 extending therefrom. The communication link 180 may be a dial-up communication, allowing communication sessions to be established and ended, or may be a dedicated line or hardwired link coupling the communication circuitry 170 to communication circuitry associated with another computer system.

The present invention introduces a data collection subsystem and a data storage and communication subsystem. The subsystems are preferably embodied in sequences of software instructions that are storable in the mass storage unit 150 or volatile memory 160 and are executable in the processor 140 to gather, combine and store data and, by means of the communication circuitry 170, transmit data to, or receive data from, other computer systems.

Figure 2:
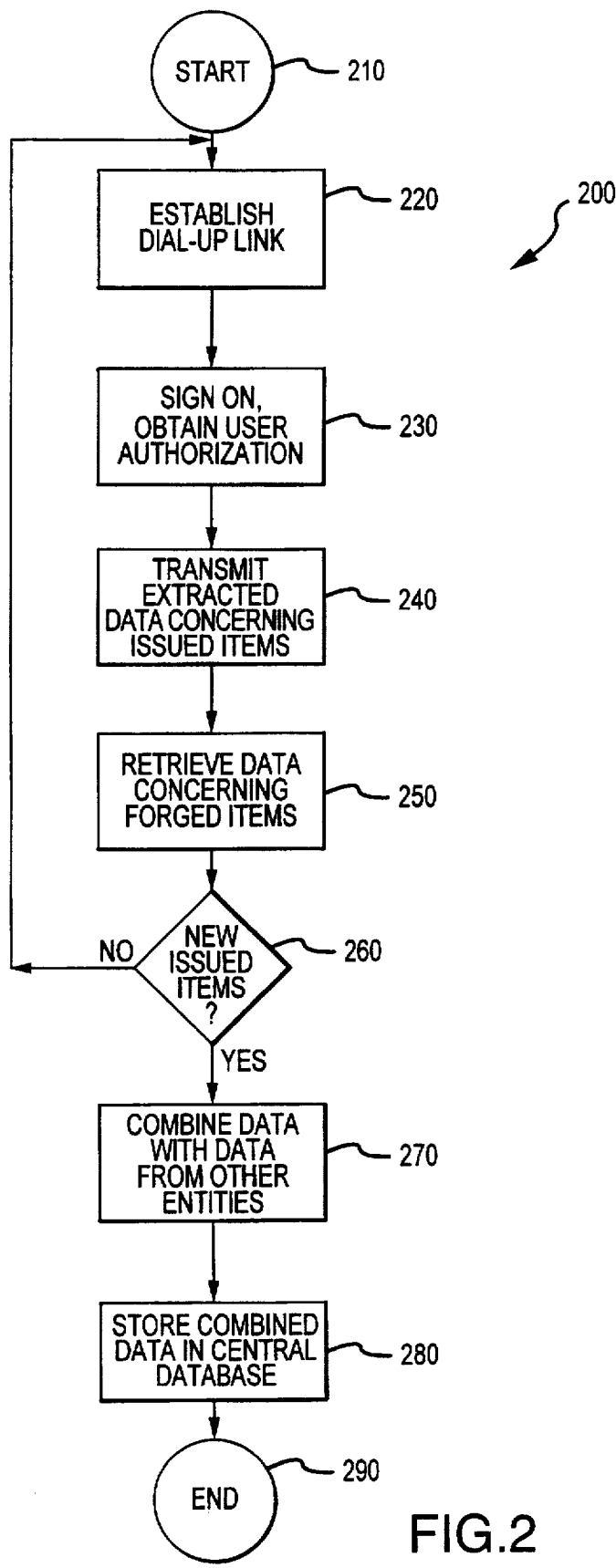
FIG. 2 illustrates a flow diagram of one embodiment of a method of gathering data regarding issued items from an entity having issued items.

Turning now to FIG. 2, illustrated is a flow diagram of one embodiment of a method of gathering data regarding issued items from an entity having issued items. The method, generally designated 200, begins in a start step 210, wherein it is desired to initiate a communications session with the data storage and communication subsystem associated with the central database 120 of FIG. 1A. For purposes of FIG. 2, it is assumed that the communications session is to take place over a dial-up link.

First, the data collection subsystem establishes the dial-up link in a step 220. Next, the data collection subsystem signs on ("logs in") to the data storage and communication subsystem and obtains authorization to proceed.

The present invention is advantageously offered as a fee-based service, particularly to the potential item recipients 130a, 130b, 130c of FIG. 1A, inasmuch as they are receiving the greatest benefit from the service. Therefore, if such service is to be fee-based, some means for authorizing users signing on to the subsystem is in order.

Next, processing continues in a step 240, wherein data gathered (and, in one embodiment, automatically extracted) from the item-issuing entity are transmitted to the data storage and communication subsystem. Again, the items may include such things as payroll checks, operating checks, money orders, traveler's checks, cashier's checks, welfare checks and food stamps. Gathering may be accomplished manually or by automatic extraction, perhaps by means of reading a magnetic ink character recognition ("MICR") file.

It may be desirable to transmit the following data concerning each issued item:

date on which item is issued, account number on which item is issued, issuing routing/transit ("R/T") number, item serial number, item amount, payee name, holder of account on which item is issued, and date on which item is paid.

Next, in an optional step 250, data concerning forged items are retrieved from the data storage and communication subsystem. The data concerning forged items may assist the item-issuing entity in question to find and prosecute the person attempting to pass a forged item. "Forged items" is used broadly to mean anything out-of-the-ordinary, such as completely forged checks, or properly-issued checks that have been altered either as to amount or payee. "Forged items" can also include a properly-issued checks that have been tendered more than once for payment.

Next, in a decisional step 260, the data storage and communication circuitry determines whether the issued-items data it has received from the item-issuing entity contains any newly-issued items. If so, those newly-issued items should be added to the central database. If not, the communications session can simply end. Accordingly, if no newly-issued items are present, processing returns (via a NO branch of the decisional step 260) to the step 220, wherein, after passage of a suitable amount of time, a further communications session is established for purposes of updating the central database and (perhaps) retrieving forged check data.

If newly-issued items are present, processing continues (via a YES branch of the decisional step 260) to a step 270, wherein data gathered from the item-issuing entity in the steps 220–250 are combined with data from other item-issuing entities. Next, in a step 280, such combined data are stored in the central database alongside data already present in the central database thereby to yield an updated database for the benefit of potential item recipients. The method 200 finally ends in an end step 290.

The method 200 may best be illustrated with an example. Assume that XYZ Corporation issues bi-monthly payroll checks to its employees. The employees are, of course, free to deposit their checks in banks or spend them as they please. For the pay period ending Mar. 15, 1997, XYZ Corporation authorizes 500 checks to be issued to its employees. The checks happen to be numbered 10001 through 10500.

Unbeknownst to XYZ Corporation, a payroll employee absconds with check number 10501, makes the check payable to himself and forges the president's signature.

XYZ Corporation is assumed to be a member of the organization maintaining a system the operates according to the present invention. Therefore, XYZ Corporation establishes a communication session with the data storage and communication subsystem, notifying the data storage and communication system that it has properly issued checks numbered 10001 through 10500.

Optionally, XYZ Corporation may notify the data storage and communication subsystem of the amounts and/or payees of each check, allowing potential item recipients to determine whether an otherwise properly-issued item had been altered by amount and/or payee.

Figure 3:
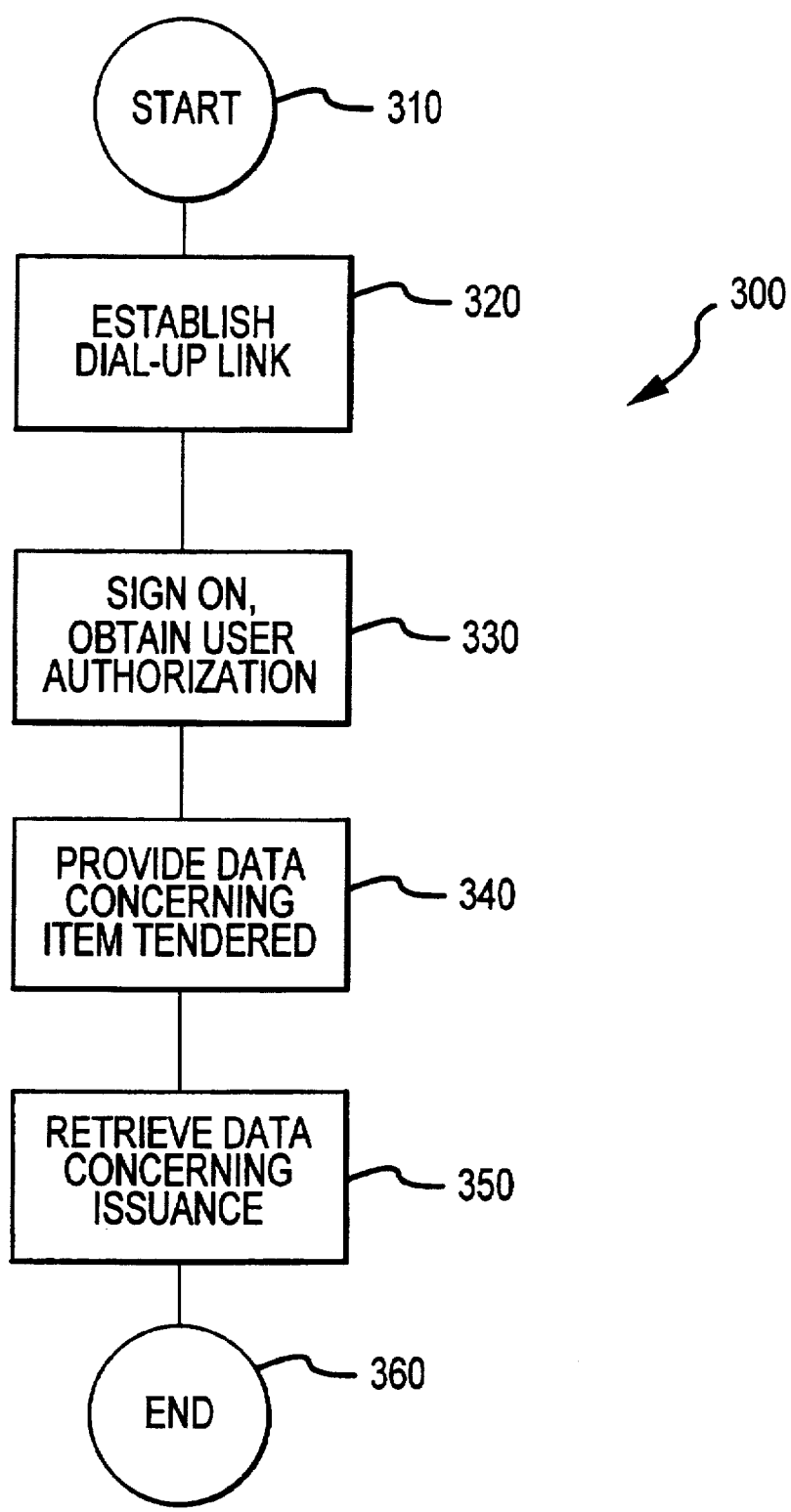
FIG. 3 illustrates a flow diagram of one embodiment of a method of providing access of a central database to a potential item recipient to allow the potential item recipient to receive advance notification as to whether an item to be received by the potential item recipient was properly issued.

Turning now to FIG. 3, illustrated is a flow diagram of one embodiment of a method of providing access of a central database to a potential item recipient to allow the potential item recipient to receive advance notification as to whether an item to be received by the potential item recipient was properly issued. The method, generally designated 300, begins in a start step 310, wherein a potential item recipient has been tendered an unverified item. The potential item recipient wishes to contact the data storage and communication subsystem to determine whether the item was, in fact, properly issued (or, perhaps, previously paid) to allow the potential item recipient to make an informed decision whether or not to accept the item.

The method 300 continues in a step 320, wherein a dial-up link is established between the potential item recipient and the data storage and communication subsystem. Again, the fact that it is a dial-up link as opposed to any other type of communications link is not germane to the present invention.

Once a dial-up link has been established, the potential item recipient signs on and obtains user authorization (in a step 330) to gain access to the issued item data contained in the central database. In the illustrated embodiment, the potential item recipient transmits, to the data storage and communication subsystem, data concerning the item tendered to the potential item recipient (in a step 340).

The data concerning the item tendered may be transmitted manually, perhaps by means of touch-tone phone, or automatically, perhaps by reading the MICR line on a check. The data storage and communication subsystem responds with an indication of whether the item in question is contained in its central database (in a step 350). This indication may include information as to whether the item is properly issued, has already been paid or differs in amount or payee. This indication may simply be that the item is not contained in the central database at all, indicating perhaps that the entity issuing the item does not belong to the organization maintaining the system. The indication may be in the form of computer data or may be spoken over the phone to an employee of the potential item recipient.

Alternatively, the data storage and communication circuitry may simply download all or a portion of its data concerning issued items to the potential item recipient, allowing the data to be compared locally. This may be particularly advantageous when the potential item recipient is a high-volume recipient (such as a bank or large retailer). Finally, the method ends in an end step 360.

Continuing with the above real-world example, the payroll clerk wishes to buy furniture with the forged check and, when the deal is cemented, tenders the forged check to the local furniture store in full payment for the furniture purchase. In the past, the furniture store would have had no particular cause for concern, inasmuch as the check is a payroll check issuing from a large, well-known company. With benefit of the present invention, however, the furniture store (assumed again to be a member of the organization) establishes a communication session with the data storage and communication circuitry and finds, much to its surprise, that the central database contains no indication that check number 10501 has ever been issued.

While the unsuspecting payroll clerk waits, the furniture store notifies the authorities; the clerk is taken into custody and the furniture store is spared a significant loss.

From the above, it is apparent that the present invention provides a system for, and method of, providing advance notification of issued items. In one embodiment, the system includes: (1) a data collection subsystem that gathers data regarding the issued items from an entity having issued items and transmits the data in a prescribed form and (2) a data storage and communication subsystem, including a central database, that receives the data from the data collection subsystem, combines the data with data gathered from other entities having issued items, stores the combined data in the central database and provides access of the central database to a potential item recipient thereby to allow the potential item recipient to receive advance notification as to whether an item to be received by the potential item recipient was properly issued.

Although the present invention has been described in detail, those skilled in the art should understand that they can make various changes, substitutions and alterations herein without departing from the spirit and scope of the invention in its broadest form.

What is claimed is:

1. A system for providing advance notification of issued items, comprising:

a data collection subsystem that gathers data regarding said issued items from an entity having issued items and transmits said data in a prescribed form; and a data storage and communication subsystem, including a central database, that receives said data from said data collection subsystem, combines said data with data gathered from other entities having issued items, stores said combined data in said central database and provides access of said central database to a potential item recipient thereby to allow said potential item recipient to receive advance notification as to whether an item to be received by said potential item recipient was properly issued.

2. The system as recited in claim 1 wherein said data includes an indication that ones of said issued items have been previously paid.

3. The system as recited in claim 1 further comprising a dial-up link coupling a point-of-sale terminal associated with said potential item recipient with said central database.

4. The system as recited in claim 1 further comprising a dial-up link coupling said data collection subsystem and said data storage and communication subsystem.

5. The system as recited in claim 1 wherein said data collection subsystem comprises a sequence of instructions executable in a general purpose computer system for performing a batch extract of said data.

6. The system as recited in claim 1 wherein said potential item recipient is selected from the group consisting of:

a retailer, and a presenting financial institution (FI).

7. The system as recited in claim 1 further comprising a plurality of data collection subsystems corresponding to said other entities.

8. A method of providing advance notification of issued items, comprising the steps of:

gathering data regarding said issued items from an entity having issued items;

combining said data with data gathered from other entities having issued items;

storing said combined data in said central database; and providing access of said central database to a potential item recipient thereby to allow said potential item recipient to receive advance notification as to whether an item to be received by said potential item recipient was properly issued.

9. The method as recited in claim 8 further comprising the step of including an indication in said data that ones of said issued items have been previously paid.

10. The method as recited in claim 8 further comprising the step of coupling a point-of-sale terminal associated with said potential item recipient with said central database via a dial-up link.

11. The method as recited in claim 8 wherein the step of combining comprises the step of establishing a dial-up link.

12. The method as recited in claim 8 wherein said step of gathering comprises the step of performing a batch extract of said data.

13. The method as recited in claim 8 wherein said potential item recipient is selected from the group consisting of:

a retailer, and a presenting financial institution (FI).

14. The method as recited in claim 8 further comprising the step of gathering data regarding issued items from said other entities.

15. A system for providing advance notification of issued items, comprising:

a plurality of data collection subsystems that automatically extract data regarding said issued items from an entity having issued items and transmit said data in a prescribed form;

dial-up links selectively coupling said plurality of data collection subsystems to a data storage and communication subsystem, said data storage and communication subsystem including a central database and capable of receiving and combining said data from said plurality of data collection subsystems and storing said combined data in said central database; and dial-up links selectively coupling point-of-sale terminals associated with potential item recipients with said central database, said data storage and communication subsystem providing access of said central database to said potential item recipients thereby to allow said potential item recipient to receive advance notification as to whether an item to be received by said potential item recipient was properly issued.

16. The system as recited in claim 15 wherein said data includes an indication that ones of said issued items have been previously paid.

17. The system as recited in claim 15 wherein said issued items are checks.

18. The system as recited in claim 15 wherein said plurality of data collection subsystems each comprise a sequence of instructions executable in a general purpose computer system for performing a batch extract of said data.

19. The system as recited in claim 15 wherein said potential item recipient is selected from the group consisting of:

a retailer, and a presenting financial institution (FI).

20. The system as recited in claim 15 further comprising a plurality of data collection subsystems corresponding to said other entities.

* * * * *